FIG. 1.
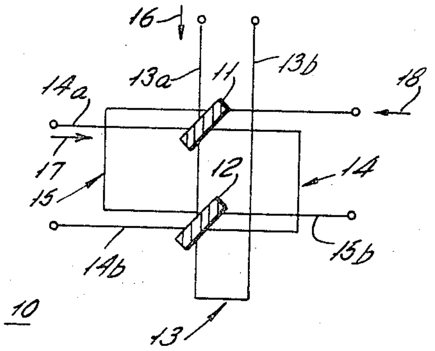
FIG. 2.
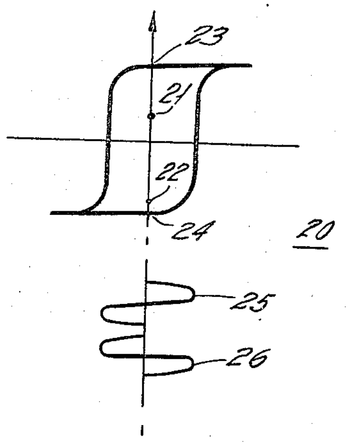
FIG. 3.
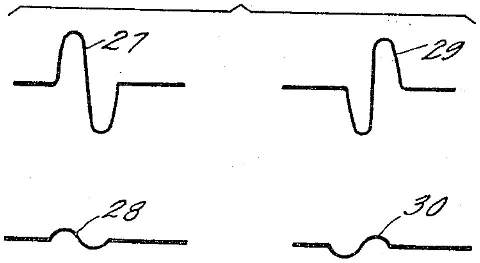
FIG. 4.
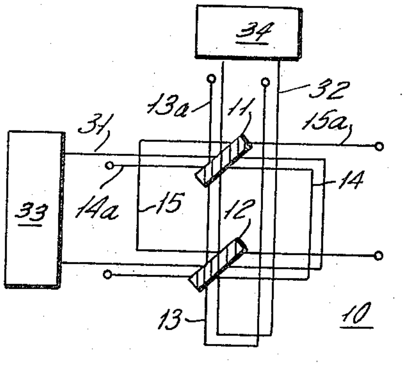
| EXTERIOR | | MEMORY | | | DETECTION | |
|---|---|---|---|---|---|---|
| BINARY STATE | PULSE | BINARY STATE | CORE 11 | CORE 12 | COMPARE | PULSE |
| "1" | 25 | "1" | 21 | 22 | YES | 27 |
| "1" | 25 | "0" | 22 | 21 | NO | 29 |
| "0" | 26 | "1" | 21 | 22 | NO | 29 |
| "0" | 26 | "0" | 22 | 21 | YES | 27 |
FIG. 5.
INVENTOR.
HIROSHI IHARA
BY
OSTROLENK, FABER, GERB & SOFFEN
ATTORNEYS United States Patent Office 3,375,504
Patented Mar. 26, 1968

3,375,504

SYSTEM FOR INTERROGATING AND DETECTING THE STORED INFORMATION OF MAGNETIC CORES

Hiroshi Ihara, Tokyo, Japan, assignor to Nippon Electric Company Limited, Tokyo, Japan, a corporation of Japan Filed Jan. 23, 1964, Ser. No. 339,772
Claims priority, application Japan, Jan. 29, 1963, 38/3,978
10 Claims. (Cl. 340—174)

ABSTRACT OF THE DISCLOSURE

This invention teaches a memory system having comparison interrogation capability performed in such a manner as to provide non-destructive readout of the memory devices.

Each bit of a word stored in the memory system is stored in a memory means which is comprised of two magnetic cores per stored bit. The cores preferably have similar substantially square hysteresis characteristics, but the squareness of the characteristic and the identical characteristics for each pair of cores is not an absolute necessity toward successful operation of each bit storage means. In order to store a first binary state a first of the cores is driven to a magnetization state which is relatively close to a zero magnetization state and in any case is appreciably less than the positive saturation level of the core. The remaining core of the two core per bit memory is driven to a negative magnetization state which is quite close to the negative saturation state of the core. An interrogation winding is provided which is threaded through said cores in the same direction so that a unidirectional current passing through said drive winding will drive both cores in the same sense. A readout winding is threaded through both cores in opposite directions so that any change in state of the magnetic cores which are being driven in the same sense by a current in the drive winding will be inductively coupled to the sense winding in opposite directions so that some portion of one of the induced currents will operate to cancel the other induced current as a result of a change of state in the two magnetic cores.

In order to interrogate the two core per bit memory and establish whether a comparison or lack of comparison exists between the bit in memory and a bit in an external source, a single cycle sinusoidally varying signal is applied to the drive or interrogation winding. The state of the external bit is identified by the magnitude and direction of the sinusoidal one cycle current pulse. For example, a first binary state is represented by the pulse initially going positive at the beginning of the one cycle pulse from a zero reference level. The opposite binary state is represented by the leading edge of the pulse initially going negative. The cores of the two core per bit storage means can likewise be altered from the manner described above to represent the other bit state by reversing the magnetization states set forth above.

If comparison exists between the state of the stored bit and the external bit the sense winding will generate a single cycle sinusoidally varying pulse which is substantially in phase with the interrogating drive pulse. If the stored bit and external bit are of differing binary states the single cycle sinusoidally varying pulse generated in the sense winding will be substantially 180° out of phase with the interrogation driving pulse.

The instant invention relates to magnetic core storage systems and the like and more particularly to magnetic core storage systems of the two-cores per bit type which is so adapted as to provide a non-destructive readout signal which is a signal indication of the comparison between the data stored within the system as against the data exterior to the system.

In memory devices of the magnetic core type, there are two basic approaches which are utilized for retrieving the information stored in such memory devices. The first ap- approach is that of specifiying by the means of electronic sginals the physical location or address which the data is stored so as to retrieve such data. The other approach is that of retrieving information which is associated to specified information which is located exterior to the memory storage device. The latter system is of recent vintage and is normally identified as the "Content Addressed Memory," or "Associative Memory." In such Content Addressed Memory Systems, it is necessary to provide the system with the function of detecting whether the system stores any information associated with externally specified information by interrogating all of the stored information. The instant invention relates to an interrogating and detecting system of this general type.

Among the literature available on Content Addressed Memories employing magnetic cores, the IBM Journal of Research and Development, vol. 6, No. 1, page 12, sets forth therein a representative description of this general subject. The system of the instant invention relates to the type of system circuits described in this article and in other prior publications and reference is herein made to this prior publication for simplifying the explanation of the present invention. However, the system described herein is substantially different than that system set forth in the above mentioned publication with respect to both the magnetization state of the magnetic cores and the physical arrangement of magnetic cores and conductors provided within the system.

The basic objective desired is that of providing a magnetic core storage system of the two-core bit type having the capability of storing data for indefinite periods of time and of providing output signals indicative of the data stored within these magnetic core storage systems through the utilization of non-destructive readout principles. The magnetic core storage system is provided with sufficient storage capacity to store the amount of data bits and hence data words which is desired for use in computers and other data processing systems. The interrogation of the storage system is performed by first selecting a data word presented in binary form from some location or device exterior to the memory storage system. The binary states of each bit making up the data word which is exterior to the storage system are then impressed upon the storage system in the form of interrogation pulses. These interrogation pulses are impressed upon the data storage system on a bit by bit basis, in either serial or parallel fashion. Each data word of the storage system is interrogated in order to determine the comparison between the exterior data word and each data word within the memory storage system. Output signals are then provided from the memory storage system to indicate either a comparison or a lack of comparison condition.

The instant invention performs all of the above functions, while at the same time providing a non-destructive readout function of the data stored therein, thus avoiding the necessity for a subsequent rewriting operation to replace data in the memory which has been undergone an interrogation operation.

The instant invention is comprised of a two-core per bit system in which each data bit stored within the system utilizes two magnetic cores for the storage of a single binary bit of information. In order to store a binary one condition, a first one of said cores is placed in a magnetic state such that its magnetization state is greater than zero but appreciably less than the magnetization state of the saturation core of the magnetic point. It should be understood that magnetic cores having substantially square hysteresis loop characteristics are preferred for use in the instant invention, but the squareness quality of the hysteresis loop characteristic is by no means critical in order to obtain desirable results with the system of the instant invention.

The second magnetic core of the two-core per bit arrangement, which is also preferably of the square hysteresis loop characteristic type, is placed in a magnetization state which is less than zero and which is almost equal to and in very close proximity to the negative magnetization saturation point of the magnetic core. Preferably both magnetic cores should have substantially the same hysteresis loop characteristics, but the degree of similarity is not critical in order to insure successful operation of the instant invention.

Interrogation of the two cores having the above described states of magnetization may be performed by providing an interrogation conductor which threads both magnetic cores in the same direction to drive both cores toward the same saturation state. A sensing conductor is also provided which threads the first of said cores in the same direction as said interrogation conductor and which threads the second of said cores in the reverse direction from that of the interrogation conductor. The interrogation conductor is pulsed by circuit means capable of producing a full cycle of a sinusoidally varying current pulse which is initially in the positive going direction when the interrogation pulse is to represent a binary one condition and which is initially in the negative going direction when the interrogation pulse is to represent a binary zero condition. The amplitude of the current pulses impressed upon the interrogation conductor is sufficient to cause a change in the magnetization state of the first and second magnetic cores, but it of such brief duration as to reversibly return each of said magnetic cores to their original magnetization states. The interrogation pulses operate such as to generate a sinusoidally varying voltage waveform of one cycle duration in both said first and second magnetic cores such that the magnetic core in the magnetization state which is appreciably less than the positive saturation point of the core, generates a voltage waveform of a magnitude many times greater than the magnitude of the voltage pulse generated by the second magnetic core whose magnetization state is extremely close to the negative saturation state of the core.

Since the sense winding threads the first and second magnetic cores in opposite directions, the resultant voltage pulse which is detected by a suitable detecting circuit, is substantially similar to the voltage pulse generated by the first magnetic core, but has only a slightly smaller amplitude. When the detection signal generated as a result of the interrogation pulse is initially in the positive going direction, this indicates comparison between the exterior data bit and the data bit stored in the memory system. This is true regardless of whether the exterior and memory are both binary zero or are both binary one. In the case of lack of comparison, the detection voltage pulse is initially in the negative going direction. This is true regardless of whether the exterior bit is binary zero and the stored bit is binary one or whether the exterior bit is binary one and the stored bit is binary zero. Thus, in all cases, a sinusoidal waveform of one cycle duration generated at the detection circuit always indicates a comparison condition when the waveform is initially positive going and a lack of comparison condition when the waveform is initially negative going. These states are very easily distinguishable from one another since they are substantially exactly 180° out of phase with one another, thereby greatly facilitating the comparison operation performed by the two-core per bit memory described herein. The non-destructive readout aspect of the instant invention enables the memory system to be repeatedly interrogated without the necessity for rewriting destroyed information as in prior art devices, while at the same time providing adequate means for writing or inserting new binary data words into the memory at any desired time.

It is therefore one object of the instant invention to provide a novel memory storage means for use in computers, data processors and the like, having means for generating an indication of either comparison or lack of comparison as between a data word exterior to the memory and a data word or words stored within the memory.

Another object of the instant invention is to provide a novel two-core per bit memory system for use in computers, data processing systems and the like wherein the memory system is adapted to provide an indication of comparison or lack of comparison as between a data word exterior to the memory and a data word or words stored in memory wherein the comparison and lack of comparison signals generated by the memory system are clearly distinguishable from one another.

Another object of the instant invention is to provide a novel two-core per bit memory system for use in computers, data processing systems and the like wherein the memory system is adapted to provide an indication of comparison or lack of comparison as between a data word exterior to the memory and a data word or words stored in memory wherein the comparison and lack of comparison signals generated by the memory system are voltage waveforms of one sinusoidal type, each being one cycle in duration and each being 180° out of phase with the other.

Still another object of the instant invention is to provide a novel two-core per bit non-destructive memory system for use in computers, data processors and the like, wherein a first of said cores is provided with a magnetization state which is greater than zero, but appreciably less than the saturation point of the magnetic core and where the second of the magnetic cores is provided with a magnetization state which is less than zero and is extremely close to the negative saturation point of the magnetic core.

Still another object of the instant invention is to provide a novel two-core per bit system for data storage utilizable in computers, data processors and the like in which only an interrogation winding and detection winding is required for the purposes of comparing data exterior to the memory against data stored in the memory.

These and other objects of the instant invention will become apparent when reading the accompanying description and drawings in which:

FIGURE 1 is a schematic drawing showing the wiring diagram and magnetic cores employed in the two-core per bit system.

FIGURE 2 is a diagram showing the hysteresis curve of the cores employed in the arrangement of FIGURES 1 and 4 and further showing the current waveforms of the driving pulse currents employed in the instant invention.

FIGURE 3 shows a plurality of waveform diagrams depicting the voltages induced by the driving pulses of FIGURE 2.

FIGURE 4 is a schematic diagram showing the two-cores per bit system of the instant invention, together with the interrogation and detection circuits.

FIGURE 5 is a chart showing the relationship of the exterior and detection pulses with the various binary states of the memory cores.

FIGURE 1 shows a memory section 10 comprised of first and second magnetic cores 11 and 12 arranged in a two-core per bit configuration and operative in a manner to be more fully described. While the memory section 10 of FIGURE 1 is capable of storing only one data bit, it should be understood that its representation is merely for purposes of simplicity of explanation and that as many additional sections of memory may be employed depending only upon the total number of data bits desired to be stored. Each additional memory section could be of a design similar to that shown in the figure.

Each of the magnetic cores 11 and 12 is provided with a central aperture (not shown) for receiving the necessary windings or conductors. In the arrangement of FIGURE 1, a word drive winding 13 has a first arm 13*a* extending through cores 11 and 12 with the second arm 13*b* returning to the top of the figure. A digit drive winding 14 is provided, having a first arm 14*a* extending through core 11 and a return arm 14*b* extending through magnetic core 12 in the reverse direction. A sense winding 15 is provided and has a first arm 15*a* extending through core 11 and a second arm 15*b* extending through core 12. The windings 13, 14 and 15 have the polarities indicated by the arrows 16, 17 and 18, with these arrows indicating the direction of positive current through the conductors associated therewith.

The magnetic cores 11 and 12 each have hysteresis characteristics. As shown by the curve 20 of FIGURE 2, it can be seen that the hysteresis curve is a substantially square loop and it should be understood that the curve of FIGURE 2 is not critical in order to establish successful operation of the magnetic section 10 of FIGURE 1. While various conditions of magnetization of the magnetic cores 11 and 12 may be considered for storing binary information of either the binary one or binary zero state, in order to practice the instant invention, it is essential that the magnetization of the pair of cores 11 and 12 should be the following:

In order to store a binary one condition in the magnetic section 10, the magnetic core 11 is magnetized at the point 21 while the magnetic core 12 is magnetized at the point 22 within the hysteresis characteristic loop 20 of FIGURE 2.

In the case where it is desired to store a binary zero state, the relationship is reversed with the magnetization of the core 11 being at the point 22 and the magnetization of the core 12 being at the point 21. The magnetization indicated by the point 21 is identified as being the partially switched state wherein the magnetic permeability at this point is much larger than that in the neighborhood of the positive or negative saturation points 23 and 24, respectively. The magnetization indicated by the point 22 is very close to the negative saturation point 24, therefore, the permeability at this point is not much different from the permeability of the saturation point 24.

Let it be assumed that one of the cores 11 and 12 is magnetized at the point 21 and that a pulse current of the type shown by the waveform 25 is impressed upon one of the windings threading the magnetic core. The pulse current 25 is selected in such a manner that its time duration is very small in comparison with the switching time of the magnetic core and has an amplitude which is so controlled that it only reversibly changes the magnetization state of the magnetic core. In order to obtain such a result, the waveform 25 is of a sinusoidal type having a one-cycle duration which is as is shown in FIGURE 2. With a pulse current of the type 25 being impressed upon the core, this causes the magnetic core to develop a changing magnetic field which in turn generates a voltage waveform 27, shown in FIGURE 3, which a voltage waveform is developed in the output of the detection winding of the core.

In the case where a current pulse of the type shown by waveform 26 is impressed upon one winding of a magnetic core its magnetization state is at the point 21 of FIGURE 2. This causes an output voltage of the type shown by waveform 29 of FIGURE 3 to be developed in the detection winding of a magnetic core so magnetized. Thus, it can be seen, comparing the waveforms 25 and 26 in FIGURE 2 with the output waveforms 27 and 29, waveforms 25 and 27 substantially resemble one another as do the waveforms 26 and 29, and further the waveforms 25 and 26 are 180° out of phase as are the waveforms 27 and 29.

In the case where one of the magnetic cores 11 or 12 is magnetized at the point 22 and then has impressed upon it current pulses represented by the waveforms 25 and 26, this causes the output voltages depicted by the waveforms 28 and 30 of FIGURE 3 to be developed at the output or detection winding of the core. It can be seen that waveforms 28 and 30 are in-phase with the waveforms 27 and 29 respectively, but have an amplitude which is many times smaller than the amplitude of the waveforms 27 and 29.

By supplying pulse currents of the types shown by waveforms 25 and 26 to the word drive conductor 13 of FIGURE 1, it can be seen from the polarity of the connection of sense conductor 15 that the voltage induced in the sense conductor 15 is either of the same or opposite polarity compared with the waveform 27 of FIGURE 3, depending only upon the stored information which the pair of cores 11 and 12 represents.

In the content addressed memory, it is necessary to detect whether the information stored in the memory section coincides with the information interrogated from the location exterior to the memory.

FIGURE 4 shows a schematic diagram of the instant invention which is a memory section 10 comprised of magnetic cores 11 and 12 being provided with the windings 13, 14 and 15, substantially identical to those shown in FIGURE 1. The magnetic cores 11 and 12 are utilized such that one is always magnetized at the point 21 of the magnetization plot 20, while the other is magnetized at the point 22 for purposes of representing the stored information. Which of the two magnetic cores is at the point 21 or 22 is determinative of the binary state with the memory section 10.

The interrogation conductor 31 is threaded in a manner identical to that of the digit drive conductor 14 discussed previously, as well as the sense conductor 15 and the interrogation conductor 16 may be used in common with either the digit drive conductor 14 or the sense conductor 15 for the purpose of reducing the total number of conductors required. A detecting conductor 32 is provided and is threaded in the manner identical to the word drive conductor 13 and therefore may be used in common for both purposes in the same maner as previously described. This could be done simply by providing suitable switching means between the circuitry used to perform the interrogation operation and the circuitry used to perform the word drive operation.

The memory section 10 of FIGURE 4 is provided with an interrogation drive circuit 33 which is connected to the interrogation winding 31. Circuit 33 may be of any suitable circuit capable of generating the one-cycle duration waveforms 25 and 26 shown in FIGURE 2. A suitable detection circuit 34 is connected to the detection winding 32 for the purpose of both detecting the voltage induced in the detecting conductor 32 as well as differentiating as between the phases of the two possible outputs which may be developed in the detection winding.

Reference will now be made to the chart of FIGURE 5 to explain the operation of the two-core per bit system 10 of FIGURE 4:

Let it first be assumed that a binary bit of the binary one state exists exterior of the memory section 10 and that it is desired to interrogate the memory with this binary one bit to determine whether there is comparison or lack of comparison as between the exterior bit and the bit stored in memory. Since the exterior bit is binary one state, this condition causes an interrogation pulse of the type represented by waveform 25 to be generated and impressed upon interrogation conductor 31. Let it now be assumed that the memory section 10 is storing the binary one data bit. To represent this condition, magnetic core 11 is at the saturation state or point 21 of FIGURE 2, while magnetic core 12 is at the point 22. The interrogation waveform 25 causes magnetic core 11 to generate or induce an output waveform 27 of FIGURE 3. The interrogation waveform 25 causes the magnetic core 12 to induce an output voltage waveform of the type 30 shown in FIGURE 3 in the detection winding 32. The summation or resultant of the waveforms 27 and 30 of FIGURE 3 is such as to provide a waveform substantially identical to the waveform 27 and having a slightly smaller amplitude. Thus, when the exterior data bit and the memory section both store binary one conditions, the output detection pulse is of the type of the waveform 27 which is a sinusoidally varying waveform of one cycle duration which is initially positive going.

The next possible case is that where the exterior data bit is still of the binary one condition so that an interrogation pulse of the type 25 is impressed upon winding 31 but wherein the memory section 10 represents storage of a binary zero data bit. In this case, magnetic core 11 is at magnetization state 22 and magnetic core 12 is at the magnetization state 21. This causes magnetic core 11 to induce an output voltage of the waveform type 28, while magnetic core 12 generates or induces a voltage waveform of the type 29 as shown in FIGURE 3 with the resultant waveform is one substantially identical to that of waveform 29 with the amplitude being slightly diminished. It can be seen that this waveform is of a sinusoidal type of one cycle duration and is initially in the negative going direction. It can clearly be seen that these resultant waveforms are 180° out of phase with one another. In the next case, when the exterior data bit is of the binary one state, the interrogation drive circuit 33 generates a pulse current having the waveform 26 shown in FIGURE 2. This pulse is in turn impressed upon the interrogation winding 31.

Assuming that the memory stores a binary one condition, magnetic cores 11 and 12 are in the magnetization states 21 and 22 respectively. The interrogation pulse 26 causes magnetic core 11 to induce a voltage pulse represented by the waveform 29 of FIGURE 3. Further, the interrogation pulse 26 causes magnetic core 12 to induce a voltage signal of the waveform 28 shown in FIGURE 3 in the detection winding 32. The resultant waveform is substantially similar to the waveform 29, but slightly smaller in magnitude due to the subtractive function performed as between the waveforms 28 and 29.

In the case where the memory section stores a binary zero condition and is interrogated by an exterior binary zero condition, the cores 11 and 12 are in the magnetization states 22 and 21 respectively, and being interrogated with a pulse 26. This causes magnetic core 12 to induce a voltage having the waveform 27 in the detection winding 32, while magnetic core 11 induces a voltage of the type 30 shown in FIGURE 3, with the resultant waveform being substantially similar to the waveform 27. It can thus be seen from the chart of FIGURE 5 that in the case where comparison exists the output waveform is a pulse of the type shown by 27 in FIGURE 3. In the case where there is no comparison, the waveform is of the type 29 shown in FIGURE 3. These waveforms of comparison and lack of comparison are generated regardless of the two compared states or lack of compared states. For example, if the exterior location and memory are both binary one, or binary zero, the compare waveform is the same. In a like manner, if the exterior location and memory are binary one and zero respectively, or binary zero and one respectively, the no-compare waveform is identical in both cases. To further facilitate a detection operation, the compare and no-compare pulses 27 and 29, respectively, are readily distinguishable from one another since they are 180° out of phase, thus greatly simplifying interrogation of the memory.

It can be seen from the foregoing that a content addressed memory employing magnetic cores can be easily realized using the concepts described herein and operate such that non-destructive readout is possible utilizing only two windings in a two-core per bit system in which detection of comparison or lack of comparison is readily distinguishable due to the 180° phase shift between the two detection pulses which may be generated.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first pulse generating means including first winding means threading said first and second core means in a first direction to drive both cores toward the same saturation state; second sense winding means threading said first core means in a first direction and threading said second core means in a second direction to cause currents of opposing directions to be induced therein as a result of operation of said pulse generating means; one of said core means having a positive magnetization state substantially less than the positive saturation state of said core means; the other of said core means having a negative magnetization state in close proximity to the negative saturation state of said core means to represent the state of the bit stored in memory; said pulse generating means including means to generate a pulse waveform having a first portion for interrogating said cores immediately followed by a second pulse portion for immediately restoring said cores to the states which they occupied prior to the application of the first pulse portion.

2. The memory means of claim 1 wherein said pulse generating means is comprised of first circuit means for generating a full cycle sine wave interrogation pulse in said first winding means for non-destructively interrogating the binary state of said memory means.

3. The memory means of claim 2 wherein said sine wave pulse has a time duration substantially less than the switching time of said magnetic core means.

4. The memory means of claim 2 wherein said signal is initially positive going to represent one binary state and being initially negative going to represent the opposite binary state of the exterior binary bit.

5. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative magnetization state in close proximity to the negative saturation state of said core means; first circuit means for generating a single cycle sine wave interrogation pulse in said first winding means for non-destructively interrogating the binary state of said memory means; said first circuit means comprising means for generating a signal for non-destructively interrogating said memory means; said second winding means including detection circuit means; said magnetic core means inducing a first single cycle sine wave output signal in phase with said pulse in said second winding means when said binary bit in memory compares with the exterior binary bit and a second single cycle sine wave output signal out of phase with said pulse in said second winding means when said binary bit in memory does not compare with the exterior binary bit.

6. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative magnetization state in close proximity to the negative saturation state of said core means; first circuit means for generating an interrogation pulse in said first winding means for non-destructively interrogating the binary state of said memory means; said first circuit means comprising means for generating a signal for non-destructively interrogating said memory means; said second winding means including detection circuit means; said magnetic core means inducing a first output signal in said second winding means when said binary bit in memory compares with the exterior binary bit and a second output signal in said second winding means when said binary bit in memory does not compare with the exterior binary bit; said first and second output signals being of the sinusoidal type; said first and second output signals being 180° out of phase relative to each other to facilitate the recognition of the state of comparison between the binary bit in memory and the binary bit exterior to memory.

7. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative megnetization state in close proximity to the negative saturation state of said core means; first circuit means for generating an interrogation pulse in said first winding means for non-destructively interrogating the binary state of said memory means; said first circuit means comprising means for generating a signal for non-destructively interrogating said memory means; said signal having a time duration substantially less than the switching time of said magnetic core means; said signal being a sinusoidal type signal of substantially one cycle duration, said signal being initially positive going to represent one binary state and being initially negative going to represent the opposite binary state of the exterior binary bit; said second winding means including detection circuit means; said magnetic core means inducing a first output signal in said second winding means when said binary bit in memory compares with the exterior binary bit and a second output signal in said second winding means when said binary bit in memory does not compare with the exterior binary bit.

8. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative magnetization state in close proximity to the negative saturation state of said core means; first circuit means for generating an interrogation pulse in said first winding means for non-destructively interrogating the binary state of said memory means; said first circuit means comprising means for generating a signal for non-destructively interrogating said memory means; said signal having a time duration substantially less than the switching time of said magnetic core means; said signal being a sinusoidal type signal of substantially one cycle duration, said signal being initially positive going to represent one binary state and being initially negative going to represent the opposite binary state of the exterior binary bit; said second winding means including detection circuit means; said magnetic core means inducing a first output signal in said second winding means when said binary bit in memory compares with the exterior binary bit and a second output signal in said second winding means when said binary bit in memory does not compare with the exterior binary bit; said first and second output signals being of the sinusoidal type.

9. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative magnetization state in close proximity to the negative saturation state of said core means; first circuit means for generating in interrogation pulse in said first winding means for non-destructively interrogating the binary state of said memory means; said first circuit means comprising means for generating a signal for non-destructively interrogating said memory means; said signal having a time duration substantially less than the switching time of said magnetic core means; said signal being a sinusoidal type signal of substantially one cycle duration, said signal being initially positive going to represent one binary state and being initially negative going to represent the opposite binary state of the exterior binary bit; said second winding means including detection circuit means; said magnetic core means inducing a first output signal in said second winding means when said binary bit in memory compares with the exterior binary bit and a second output signal in said second winding means when said binary bit in memory does not compare with the exterior binary bit; said first and second output signals being of the sinusoidal type and of substantially one cycle duration.

10. Memory means of the two-core-per-bit type having non-destructive readout capabilities for generating an indication of the state of comparison between the binary bit stored in said memory and a binary bit exterior to said memory comprising first and second magnetic core means preferably exhibiting substantially square hysteresis loop characteristics; first winding means threading said first and second core means in a first direction; second winding means threading said first core means in a first direction and threading said second core means in a second direction; one of said core means having a positive magnetization state substantially less than the positive saturation state of said core means; the other of said core means having a negative magnetization state in close proximity to the negative saturation state of said core means; first circuit means for generating an interrogation pulse in said first winding means for non-destructively interrogating the binary state of said memory means; said first circuit means comprising means for generating a signal for non-destructively interrogating said memory means; said signal having a time duration substantially less than the switching time of said magnetic core means; said signal being a sinusoidal type signal of substantially one cycle duration, said signal being initially positive going to represent one binary state and being initially negative going to represent the opposite binary state of the exterior binary bit; said second winding means including detection circuit means; said magnetic core means inducing a first output signal in said second winding means when said binary bit in memory compares with the exterior binary bit and a second output signal in said second winding means when said binary bit in memory does not compare with the exterior binary bit; said first and second output signals being of the sinusoidal type and of substantially one cycle duration; said first and second output signals being 180° out of phase relative to each other to facilitate the recognition of the state of comparison between the binary bit in memory and the binary bit exterior to memory.

References Cited

UNITED STATES PATENTS 2,768,367 10/1956 Rajchman ---------- 340—174

BERNARD KONICK, *Primary Examiner.*

P. SPERBER, *Assistant Examiner.*